Patented Dec. 23, 1941

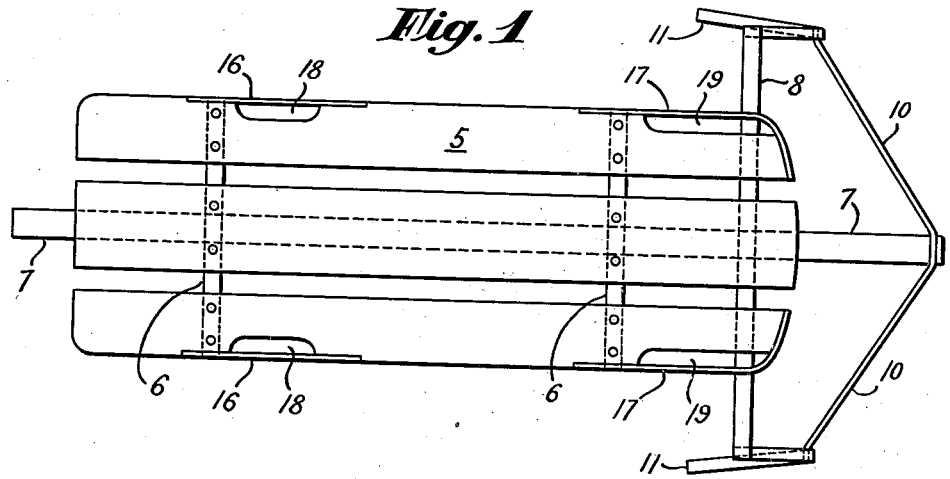
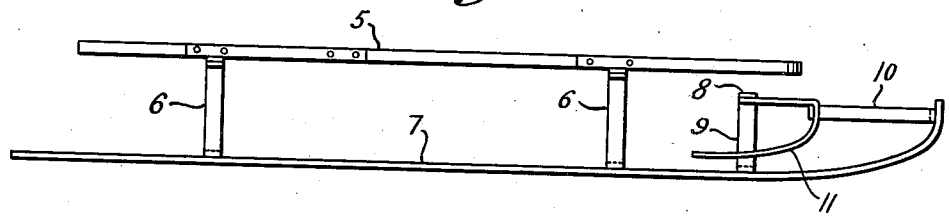
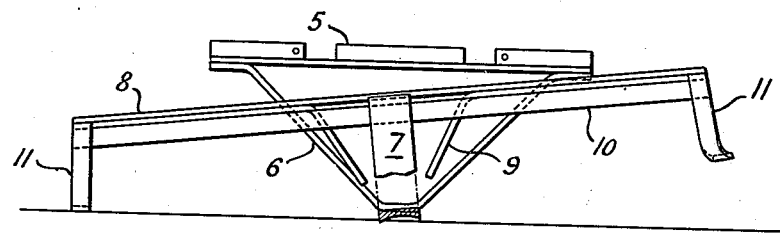
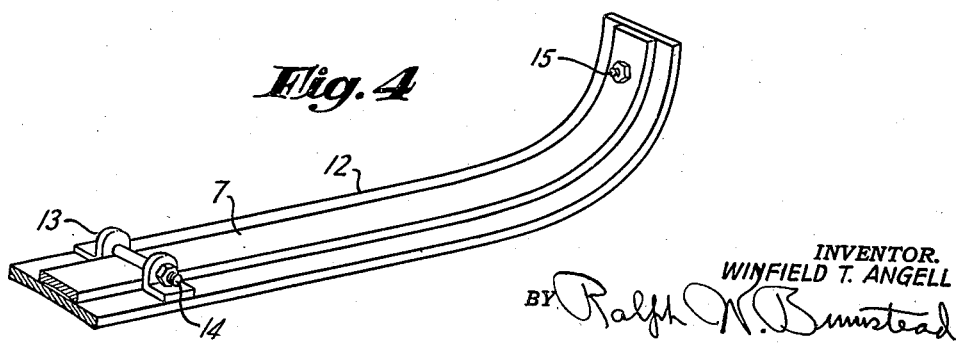

2,266,842

UNITED STATES PATENT OFFICE 2,266,842

SLED

Winfield T. Angell, Westfield, N. J.

Application February 9, 1939, Serial No. 255,389

11 Claims. (Cl. 280—12)

This invention relates to sleds and more particularly to mono-runner sleds. It is an object of my invention to provide a sled of the class described in which means are provided for steering and balancing in the same manner that a bicycle rider would steer and balance his vehicle.

It is another object of my invention to provide a sled of the class described in which the steering control is obtained by twisting a relatively flat bottom runner centrally disposed with respect to the sled platform.

It is another object of my invention to provide a sled having a load supporting runner disposed on the longitudinal axis of the vehicle and to provide auxiliary side runners which may be used to effect a sharp turning action as compared with a relatively slight turning action which is otherwise produced by twisting the load supporting runner.

I have found that when a sled is constructed in the manner hereinafter set forth in more detail that it has the advantages of light weight, broad bearing surface for use in soft snow, and is such as to give the coaster facilities for a more thrilling sport than can be enjoyed by the more conventional types of sleds.

The foregoing objects of my invention will be better understood from the following description when considered in view of the accompanying drawing, in which Figure 1 shows a plan view of a preferred embodiment of a mono-runner sled;

Fig. 2 shows a side elevation;

Fig. 3 shows a front view, the steering control means being illustrated as operative to make a turn; and Fig. 4 shows a fragmentary view of the load supporting runner with a supplemental shoe attached thereto, as when the sled is to be used in exceptionally soft snow.

Referring to the figures generally, wherein like parts are designated by like reference numerals, I show a form of construction including a platform 5 upon which the coaster lies flat. This platform is supported by a plurality of brackets 6, the lower portions of which are secured to the centrally disposed load supporting runner 7. This runner is preferably formed like a ski, and with an up-turned toe portion. The bottom of the runner is preferably made concave in order that it may hold a given course to better advantage.

My improved sled is provided with steering apparatus comprising a cross bar 8 mounted upon a transverse bracket 9, which bracket is securely fastened to the runner 7. The cross bar is suitably positioned to be grasped by the hands of the coaster, and at the ends thereof I preferably provide small side runners 11 which have a forwardly extending upper portion, a ski-toe, and a rearwardly extending bearing surface. This surface, however, is normally held out of contact with the snow, but may be pressed downwardly for steering and balancing. When the coaster bears down on one side runner, the other is correspondingly raised further above the snow. The toe of the load supporting runner and the toes of the side runners are interconnected by means of brace rods 10. The interconnections between the cross bar 8, the side runners and the main runner are such that steering may be coordinated with balancing in much the same manner as in riding a bicycle, but with this difference, however, that when the sled comes to rest at the foot of the hill, the coaster is not tipped off the platform, because part of his weight is supported by one or the other of the side runners. The side runners are also useful in effecting a sharp change of direction, as is obvious from the fact that either one can be pressed against the snow with more or less weight, so as to retard the sled on the side on which the side runner is lowered.

In order to steer the sled in the manner comparable with that of steering a bicycle I have found that the load supporting runner can be twisted chiefly by pulling backwardly upon one end of the steering bar 8. The twist thus introduced into the load supporting runner extends principally from the very toe of the runner back to the forward one of the platform-supporting brackets 6. When the runner is thus twisted, it will be seen that one edge digs into the snow and snow piles up under the other edge. This action is effective in causing the sled to veer to one side.

After one has become accustomed to the steering action of my improved sled it is found that the steering and balancing may be so co-ordinated that under normal conditions it is seldom necessary to exert any pressure of the side runners 11 upon the snow. Furthermore, it is found that one does not need to shift his weight upon the main runner to any appreciable extent.

One of the features of construction of the side runners 11 is that they are mounted at such an angle to the load supporting runner as to become parallel therewith when lowered to the same base level.

Another feature of my improved sled is that by employing a relatively flat surfaced ski runner for supporting the load, the flexibility of this runner in a vertical plane eliminates a great deal of shock due to unevenness of the snow surface. I have found too that this construction provides a somewhat feather touch for the steering action.

Since it is desired that the sled shall be found serviceable in varying conditions of snow, I have provided that the width of the load supporting runner 7 shall be that which will carry the weight of the coaster without sinking into the snow too deeply under normal conditions. But where the snow is found to be exceptionally soft, it is then possible to attach an auxiliary ski runner 12 to the main runner 7 and thus to widen the load supporting surface. This auxiliary runner 12 may be attached to the permanent runner 7 by any suitable attaching means such as clips 13 having bolt holes therein and a bolt and nut device 14 extending through the bolt holes for securely attaching the auxiliary runner to the main runner. At the forward end of the runners, that is, at the upper portion of the toe, an additional bolt and nut arrangement 15 can be provided so as to prevent slippage between the two runners.

In the construction of my improved sled it is to be understood that any suitable materials may be used such as will withstand the strains imposed upon a sled. Preferably, however, I have found that a platform of hard wood is desirable and that the other portions of the sled should for the most part be constructed of resilient steel.

The preferred construction of the platform, as best shown in Fig. 1, is such that the coaster may readily grasp the handles 16 or 17 while making a running start. The handles 16 are mounted across openings in the platform as indicated at 18. The handles 17 are similarly mounted across openings as indicated at 19. The handles 16 and 17 may be made of metal strips, if desired.

Considering the technique and skill which must be exercised in order to properly hold the sled while making a running start and then to land prostrate upon the sled platform while transferring one's hands to the steering bar, it will be appreciated that the coaster's enjoyment of the sport is gradually enhanced as he becomes more and more proficient. Furthermore, the art of balancing and steering requires practice in order to obtain the greatest enjoyment, so that one's zest for the sport increases in proportion to his dexterity in handling the sled and in preserving his balance.

While the invention has been illustrated and described in reference to one preferred embodiment, it will be understood by those skilled in the art that various modifications may be made without departing from the spirit of the invention.

I claim:

1. A sled comprising a single load-supporting runner having a gliding surface of greater width than its thickness, means for twisting the runner to maintain the balance of the coaster and to steer the sled, and means for limiting the tilt of the sled to either side.

2. A sled in accordance with claim 1 and further characterized in that the last said means comprises a pair of auxiliary runners mounted on the ends of a transverse steering bar, said auxiliary runners being carried normally out of pressure-contact with the snow surface.

3. A sled in accordance with claim 1 in combination with a detachable ski runner of greater width than said load-supporting ski runner, said detachable runner being adapted to support the load under conditions of exceptionally soft snow, and being further adapted to be twisted with the first said runner.

4. A sled having a platform, a centrally disposed load supporting runner, means for mounting said platform on said runner and in spaced relation thereto, a steering and balancing device attached at two points along the forward portion of said runner, said device including means for twisting the runner to produce a relatively small change of direction, and including side runners normally elevated above the bearing surface of said centrally disposed runner, said side runners being alternatively lowerable to the snow surface for effecting a relatively sharp change of direction.

5. In combination, a single load supporting sled-runner having an up-turned toe and a concave bottom surface of substantially greater width than its thickness, a platform, a plurality of transverse frame members connected to said runner, at least two of said members constituting supports for said platform, a steering device comprising another of said transverse frame members, a pair of relatively short runners attached to the lateral ends of the last said frame member and adapted to be selectively pressed downwardly against the snow surface, and bracing means interconnecting said short runners and the toe of said load supporting runner.

6. A sled having a flexible load-supporting runner the bottom surface of which is concave and is of a width relatively greater than its thickness, brackets attached to said runner, a coaster's platform mounted on certain of said brackets, a steering device mounted on another of said brackets, and means including bars connected between said steering device and the up-turned toe of said runner for distorting the forward part of said runner, thereby to raise one of the lateral edges of said forward part above the other edge.

7. A sled in accordance with claim 6 and having an auxiliary de-mountable flexible runner adapted to be secured underneath the first said runner, and means for effecting distortion of said de-mountable runner in conformity with the distortion of the first said runner.

8. A sled having a centrally disposed load supporting runner mounted beneath a coaster's platform, means for steering the sled, said means being simultaneously operative to twist the runner and to coordinate a load-balancing act with the change of direction which results from twisting the runner, and means including outrigger runners optionally effective when selectively pressed against the snow surface on one or the other side for changing the direction of travel at a more rapid rate than is permitted by the twisting of the runner.

9. A sled having a load-supporting runner of ski-formation, a platform mounted above said runner, a steering handle constituted by a cross-bar mounted above said runner at the forward part of the sled and independently of said platform, a balancing runner mounted on each end of the cross-bar, and brace-rods extending from the toe of said load-supporting runner to said balancing runners, whereby the load supporting runner may be twisted out of alignment with the median line of said sled.

10. A sled having a platform, a centrally disposed load-supporting runner on which said platform is mounted, steering means mounted on said runner independently of the platform, said means being adapted to twist the forward part of the runner with respect to the rear part, and auxiliary steering means comprising balancing runners supported by the first said means, said balancing runners being adapted for pressure engagement with the snow surface on either side, thereby to recover the coaster's balance under conditions of swerving too sharply away from a desired course.

11. A sled comprising a single load supporting runner having a relatively flat gliding surface of greater width than its thickness and having an upturned toe portion, steering means including a cross-arm rigidly connected by brackets to said toe portion of said runner and also to a part thereof immediately above its gliding surface and operable to twist the leading portion of the runner with respect to its trailing portion, and an elongated platform supported by said runner above its gliding surface.

WINFIELD T. ANGELL.